United States Patent [19]
Tominaga et al.

[11] Patent Number: 5,349,899
[45] Date of Patent: Sep. 27, 1994

[54] NATURAL THAWING PAN

[75] Inventors: Seigo Tominaga; Osamu Akasi; Masao Imai; Koji Sugita; Setuko Suzuki; Akira Maeda; Kazumasa Isiguro; Masahiro Uchida; Makoto Sato, all of Tokyo, Japan

[73] Assignee: Kanehiro Co., Ltd., Tokyo, Japan

[21] Appl. No.: 48,775

[22] Filed: Apr. 16, 1993

[30] Foreign Application Priority Data

Nov. 26, 1992 [JP] Japan ................... 4-087259

[51] Int. Cl.$^5$ .............................. A47J 43/00
[52] U.S. Cl. ................... 99/646 R; 99/447; 165/185; 248/346
[58] Field of Search ............. 99/422, 447, 467, 483, 99/485, 646 R; 108/51.1; 165/185; 248/346

[56] References Cited

U.S. PATENT DOCUMENTS

| | | | |
|---|---|---|---|
| 1,201,138 | 10/1916 | Bingham | 99/422 |
| 2,507,862 | 5/1950 | Mead | 165/185 |
| 2,554,412 | 5/1951 | Kavanagh | 99/447 |
| 3,154,141 | 10/1964 | Huet | 165/185 |
| 3,385,357 | 5/1968 | Burg | 165/185 |
| 3,722,402 | 3/1973 | Plumley | 99/467 |
| 3,747,509 | 7/1973 | Hinkle | 99/483 |
| 4,716,819 | 1/1988 | Beltz | 99/447 |
| 4,768,427 | 9/1988 | Cheng | 99/422 |
| 5,067,396 | 11/1991 | Sorensen et al. | 99/447 |

FOREIGN PATENT DOCUMENTS

| | | | |
|---|---|---|---|
| 21475 | 3/1936 | Australia | 99/422 |
| 268186 | 5/1988 | European Pat. Off. | 99/646 R |
| 2120531 | 12/1983 | United Kingdom | 99/447 |
| 2243534 | 11/1991 | United Kingdom | 248/346 |

Primary Examiner—David A. Scherbel
Assistant Examiner—Mark Spisich
Attorney, Agent, or Firm—Notaro & Michalos

[57] ABSTRACT

A lower surface of a plate made of material with a well heat transfer characteristics such as pure aluminum or aluminum alloy is provided with a plurality of heat radiation fins and further with legs in order to provide a natural thawing pan capable of shortening a thawing time more remarkably than that of the prior art even though the natural thawing process is applied. In this case, the surface of the plate or the heat radiation fins may be processed with Almite or special coating or a plurality of irregular portions may be arranged there or the lower ends of the legs can be fixed with soft anti-slipping members.

8 Claims, 4 Drawing Sheets

NATURAL THAWING PAN

BACKGROUND OF THE INVENTION

1. Field of the Invention

This invention relates to a natural thawing pan which is preferable for use in performing a natural thawing of frozen foods such as meats or fishes and the like.

2. Description of the Prior Art

As means for thawing the frozen foods such as meats or fishes or the like, it has been well known in the art to provide a natural thawing in which the frozen foods are placed on a pan or a container having a shallow depth to cause the foods to be exposed to ambient conditions, for example, the surrounding air, or water is applied over the foods or the frozen foods are immersed in the container storing water therein and thawed therein or to provide a forced thawing for forcedly thawing the frozen foods with an electronic oven, a heater and steam or the like.

In these prior art methods, the forced thawing process had a short thawing time, but had some disadvantages that meats or fishes of the frozen foods to be thawed under a forced heating were deteriorated in their quality and their flavor or good taste were lost. In turn, the natural thawing process had an advantage that the meats or fishes of the frozen foods could be thawed without destroying their flavors or good tastes, but had a disadvantage that it took much time to complete the thawing operation.

SUMMARY OF THE INVENTION

It is therefore an object of the present invention to provide a natural thawing pan operated under a natural thawing process and capable of remarkably shortening a thawing time as compared with that of the prior art.

BRIEF DESCRIPTION OF THE DRAWINGS

The above and other objects, features and advantages of the present invention will be more apparent from the following description taken in connection with the accompanying drawings, in which.

DETAILED DESCRIPTION OF THE PREFERRED EMBODIMENTS

Hereinafter the exemplary embodiments of the present invention will be described in detail with reference to the accompanying drawings.

Figure 1:
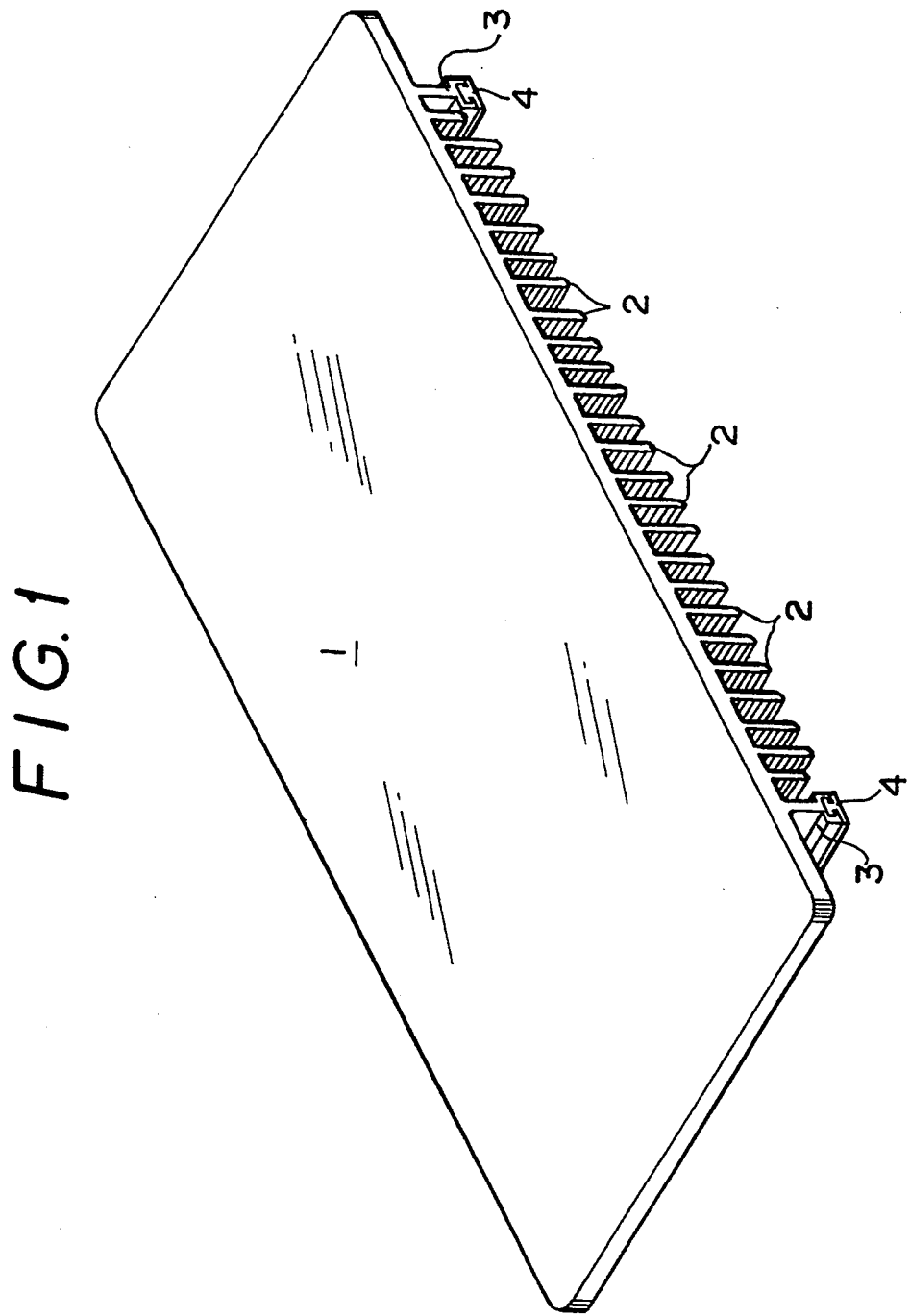
FIG. 1 is a perspective view for showing a natural thawing pan of the present invention.
Figure 2:
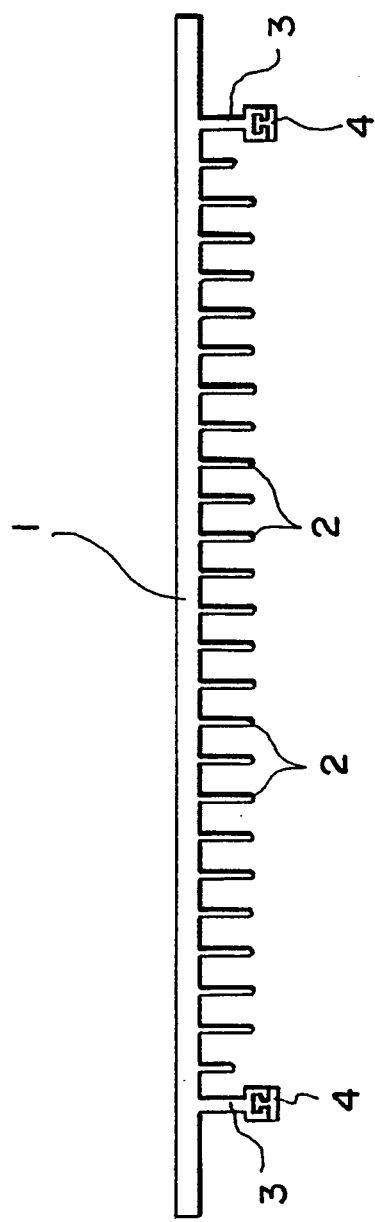
FIG. 2 is a front elevational view of the natural thawing pan shown in FIG. 1.
Figure 3:
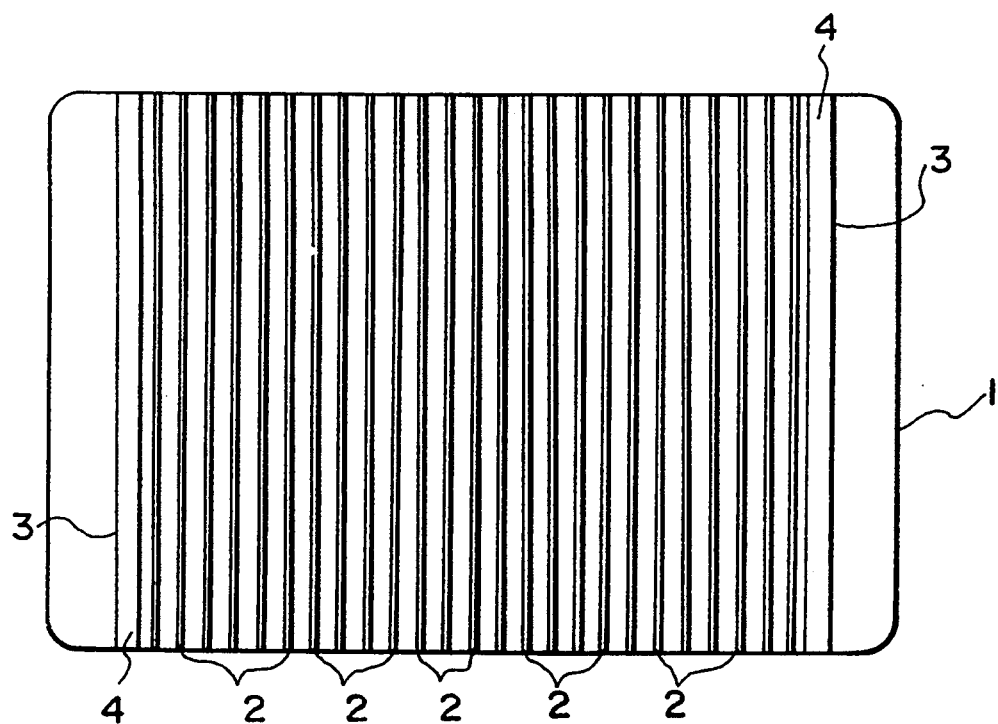
FIG. 3 is a bottom view of the natural thawing pan shown in FIG. 1.
Figure 4:
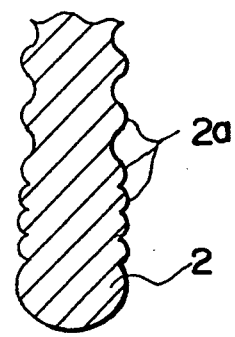
FIG. 4 is an enlarged sectional view for showing a part of a fin.
Figure 5:
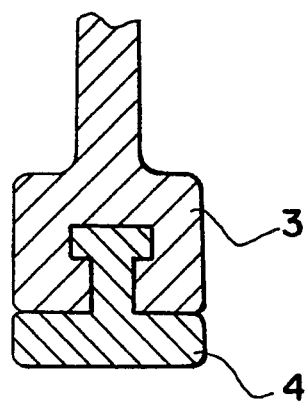
FIG. 5 is an enlarged sectional view for showing a part of a leg part.

The drawings illustrate one preferred embodiment of the present invention, wherein a reference numeral 1 denotes a plate made of material having a high heat transfer rate such as ceramics, aluminum or aluminum alloy and the like, for example. At the lower surface of the plate are integrally arranged in parallel a plurality of heat radiation fins 2, 2. . . in properly spaced apart relation in a longitudinal direction. A pair of legs 3, 3 higher than the heat radiation fins 2,2. . . are made of the same material as that of the heat radiation fins 2,2. . . and integrally arranged in parallel at both sides of the plate 1 in a longitudinal direction. Soft anti-slipping members 4, 4 of rubber or other high friction material, for example, are fixed to the lower ends of the legs 3, 3 in a longitudinal direction. As shown in FIG. 4, each of the heat radiation fins 2, 2. . . is provided with some fine irregular portions 2a, 2a. . . in order to further improve an effect of thermal radiation. As shown in FIGS. 1, 2 and 4, each of the fins 2 have parallel facing side surfaces. The irregularities in the form of the ridges 2a, are on the side surfaces of the fins. As shown in FIG. 5, each of the legs 3 includes a groove for receiving and holding the anti-slipping member. Also as shown in FIGS. 1 and 2, each of the fins which are immediately adjacent a respective leg, is shorter than the remaining fins. Although the surfaces of the plate 1, each of the thermal radiation fins 2, 2. . . and legs 3, 3 of the natural thawing pan are treated with Alumite so as to prevent deterioration in quality or corrosion, there may be provided other means such as fluorine resin processing or special enameling coating. It may be optional to arrange a peripheral groove for use in storing drip on the plate. Aluminum alloy was applied as material, a plate size was set such that its thickness was 6 m/m, its vertical and lateral sizes were 210 m/m and 320 m/m, a height at the leg was 30 m/m and a fin height and a fin thickness were in a range of 10 to 15 m/m and 2 m/m, respectively, the plate was made as shown in the drawing, and then a practical thawing experiment was carried out for various frozen foods. Then, they were compared with the results of experiment obtained under a condition in which the plate was exposed at a normal room temperature of 24° C. and the following results indicated in the table below were obtained.

In the experiment, the foods frozen and stored at −10° C. were applied and a size of each of the foods was indicated by a unit of mm.

| Type | Natural Thawing (Left at Room Temperature) | Thawing Pan of the Present Invention |
| --- | --- | --- |
| Ice (20 g) | Approx. 45 min. | 2 min. |
| Tuna (Sliced Raw Tuna) (70 × 190 × 20) | Approx. 90 min. | 12 min. |
| Pork Meat (70 × 150 × 20) | Approx. 150 min. | 18 min. |
| Chicken Meat (70 × 145 × 20) | Approx. 150 min. | 18 min. |
| Beef Meat (Stake) (70 × 140 × 30) | Approx. 180 min. | 25 min. |
| Minced Meat (70 × 150 × 30) | Approx. 180 min. | 25 min. |

In addition, the frozen foods applied in the natural thawing pan of the present invention scarcely produced drips and a turning-back of the frozen foods in the midway of the operation shortened a thawing time. Further, it could be confirmed that applying water to the adhering surfaces of the frozen foods to the plate caused the thawing time to be more fast.

As the thawed foods were cooked and their tastes were compared with that of the foods thawed under the usual natural thawing process, they showed that their freshness degree was not decreased due to their thawing in a short period of time, their flavors, tastes and eating tastes were quite similar to that of the raw foods before their freezing and so the thawed foods could be eaten deliciously.

It is further understood by those skilled in the art that the foregoing description is a preferred embodiment of the disclosed device and that various changes and modifications may be made in the invention without departing from the spirit and scope thereof.

What is claimed is:

1. A thawing pan for thawing foods under ambient conditions, comprising:
   a substantially flat rectangular plate made of material having high heat transfer characteristics, the plate having an upper flat surface for receiving food and an opposite lower surface;
   a plurality of elongated spaced parallel fins, extending from and across the lower surface of the plate, said fins including facing side surfaces;
   a plurality of elongated ridges extending along each of the facing side surfaces of the fins to increase a heat transfer characteristics of the fins;
   a pair of elongated legs extending parallel to the plurality of fins and position respectively near opposite ends of the plate and defining a space therebetween in which at least some of said fins are located, said legs extending from said lower surface a greater distance than said fins;
   said plate, fins and legs all being made of one piece of the material having the high heat transfer characteristic.

2. A pan according to claim 2, wherein at least one fin which is immediately adjacent a respective one of said legs is shorter than a remainder of said fins on the lower surface of the plate.

3. A pan according to claim 2, wherein each of said legs includes a groove extending therein and a pair of anti-slipping members made of high friction material at a bottom of each leg and engaged into each groove respectively.

4. A pan according to claim 3, wherein said material having high heat transfer characteristic contains aluminum.

5. A pan according to claim 4, wherein the material of said plate, fins and legs carries an anti-corrosion coating.

6. A pan according to claim 1, wherein each of said legs includes a groove extending therein and a pair of anti-slipping members made of high friction material at a bottom of each leg and engaged into each groove respectively.

7. A pan according to claim 1, wherein said material having high heat transfer characteristic contains aluminum.

8. A pan according to claim 1, wherein the material of said plate, fins and legs carries an anti-corrosion coating.

* * * * *